United States Patent [19]

Sutin

[11] Patent Number: 4,997,081
[45] Date of Patent: Mar. 5, 1991

[54] CONVEYOR SYSTEM FOR SHREDDED SOLID WASTE MATERIAL

[75] Inventor: Gordon L. Sutin, Dundas, Canada

[73] Assignee: EAC Systems, Inc., Albany, N.Y.

[21] Appl. No.: 352,147

[22] Filed: May 15, 1989

[51] Int. Cl.⁵ ............................................. B65G 19/00
[52] U.S. Cl. ..................................... 198/728; 198/692
[58] Field of Search ............... 198/719, 728, 731, 735, 198/692, 693

[56] References Cited

U.S. PATENT DOCUMENTS

| | | | |
|---|---|---|---|
| 1,094,780 | 4/1914 | Depew | 198/692 |
| 1,758,484 | 5/1930 | Slyke | 198/728 |
| 1,812,287 | 6/1931 | Davis | 198/692 |
| 2,311,747 | 2/1943 | Gooch | 198/728 X |
| 2,790,538 | 4/1957 | Collins et al. | 198/692 |
| 3,099,347 | 7/1963 | Dahlquist | 198/692 |
| 4,602,572 | 7/1986 | Giaier et al. | 110/342 |
| 4,740,127 | 4/1988 | Galgana et al. | 414/173 |

FOREIGN PATENT DOCUMENTS 360964 10/1922 Fed. Rep. of Germany ...... 198/728

Primary Examiner—H. Grant Skaggs
Assistant Examiner—Keith L. Dixon
Attorney, Agent, or Firm—Hoffman & Baron

[57] ABSTRACT

A conveyor system for transporting shredded solid waste material to a boiler is provided. The system includes a flighted drag chain conveyor positioned within a trough-like enclosure. The conveyor includes a number of drag elements mounted to each flight, the drag elements including spring mounted tines which urged the shredded waste material through the enclosure. The tines are deflectable about the axes of the respective springs so that they can deflect about difficult to move items within the conveyor enclosure. The drag elements are preferably arranged in a staggered configuration to aid in dislodging items which may be stuck within the conveyor enclosure. One or more discharge outlets are mounted to the conveyor enclosure for receiving the shredded solid waste material from the enclosure.

16 Claims, 2 Drawing Sheets

CONVEYOR SYSTEM FOR SHREDDED SOLID WASTE MATERIAL

BACKGROUND OF THE INVENTION

1. Field of the Invention

The field of the invention relates to systems for delivering refuse fuel to a boiler/incinerator.

2. Brief Description of the Prior Art

Solid waste from municipal and industrial sources is being used in increasing amounts as boiler fuel in the commercial generation of steam and electricity. This is done for economic reasons as well as because of a diminishing number of available landfills. The waste is generally preliminarily processed before its being fed to the boiler. Such processing typically includes shredding and then separating ferrous materials from the shredded waste with a magnetic separator. Recyclable and/or unprocessable materials may also be removed from the waste at a picking station prior to its transferral to the shredder.

Various systems have been devised for providing shredded waste material to the boiler of a waste treatment facility. U.S. Pat. No. 4,740,127 is directed to one such feeder assembly which includes a pair of diagonally oriented belt conveyors which define opposite sides of a hopper. Waste material deposited in the hopper is transferred to a chute conveyor which in turn carries it to a steam generating furnace. A second system employing an inclined conveyor for discharging solid waste fuel to a boiler is disclosed in U.S. Pat. No. 4,602,572.

The transferal of shredded solid waste material from the shredder to one or more discharge outlets may be accomplished by a conveyor which drags the material through a trough-like enclosure One of the problems encountered in such systems is the tendency of the conveyor to become caught upon some of this material, particularly over discharge outlets which may have filled up to an overflowing level. The conveyor, which is positioned above such outlets, would tend to ride up on or jam against the waste material, thereby rendering the entire conveying system substantially inoperable.

SUMMARY OF THE INVENTION

It is an object of the invention to provide a system for conveying shredded waste material to a boiler.

It is another object of the invention to provide a conveyor system which will reduce the possibility of jamming of the shredded waste material.

A still further object of the invention is to provide a conveyor system including a drag conveyor capable of moving shredded waste material along a conveyor enclosure to discharge outlets which adjoin the enclosure.

In accordance with these and other objects of the invention, a conveying system is provided which includes a conveyor enclosure having a base and side walls, a conveyor positioned at least partially within the conveyor enclosure, the conveyor including a plurality of flights and a plurality of deflectable drag elements mounted to the flights and extending within said conveyor enclosure and towards the base thereof. Upon encountering difficult to move items, the drag elements will be deflected rather than causing a potential jam. The conveyor enclosure is elongate in construction and includes one or more discharge outlets through which the waste material is removed.

In accordance with a preferred embodiment of the invention, the drag elements includes spring-mounted tines. Each tine has a rounded or otherwise shaped end so that it has no edges which would tend to catch the waste material. The tines are positioned in a staggered arrangement to allow difficult items to be repositioned within the conveyor assembly and transported more easily.

DETAILED DESCRIPTION OF THE INVENTION

Figure 1:
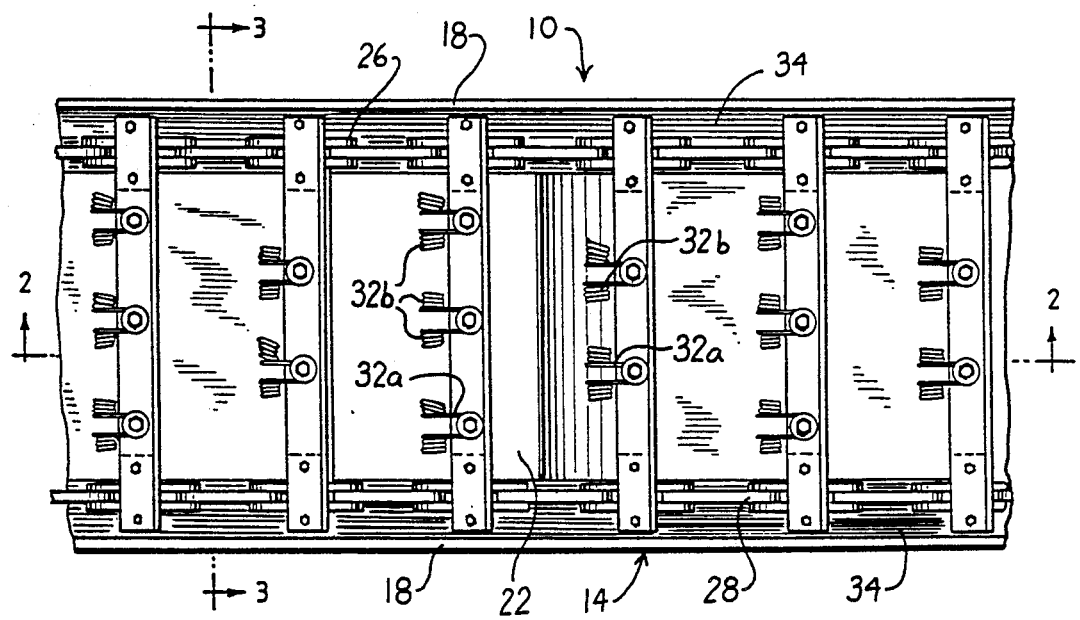
FIG. 1 is a top plan view of a conveyor system according to the invention.

A conveyor system 10 is provided for transporting shredded solid waste material 12 along an elongate, trough-like conveyor enclosure 14. The waste material to be transported typically includes such materials as shredded paper, plastics, glass, metal, textiles, wood, and food waste.

Solid waste material from residential, commercial and light industrial sources is, to a large extent, usable as fuel within boilers. The waste material must first be processed prior to its introduction to the boiler. Such processing includes, for example, separating out recyclable materials and unshreddable items, shredding the remaining waste material, and removing ferrous metals from the shredded waste material. The shredded waste material, which may now be referred to as processed refuse fuel, is then conveyed to a boiler where it is combusted. The conveyor system 10 provided herein may be used to great advantage in distributing this processed refuse fuel across the face of a boiler.

Referring to the figures, the conveyor enclosure 14 includes a base 16 and a pair of opposing, parallel side walls 18 extending substantially perpendicularly from the base 16. The enclosure 14 accordingly has the general construction of a trough. A plurality of discharge outlets 20 are mounted to the base 16 of the conveyor enclosure 14. The base includes an opening 22 at each outlet to provide access thereto. The trailing upper edge 24 of each discharge outlet 20 is rounded (i.e. cylindrical) or otherwise constructed so as to present no sharp angular corner against which conveyed material may jam or compact. Each discharge outlet 20 preferably has a width which is equal to that of the conveyor enclosure 14.

Figure 2:
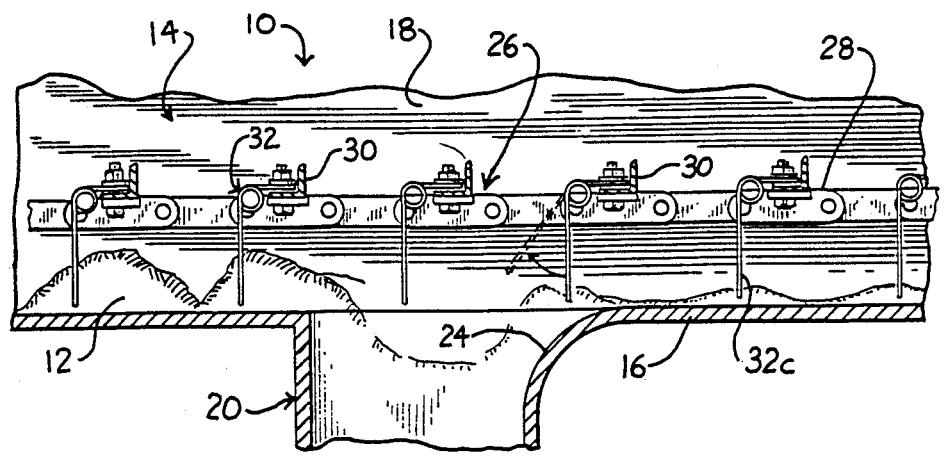
FIG. 2 is a sectional view thereof taken along line 2—2 of FIG. 1.
Figure 3:
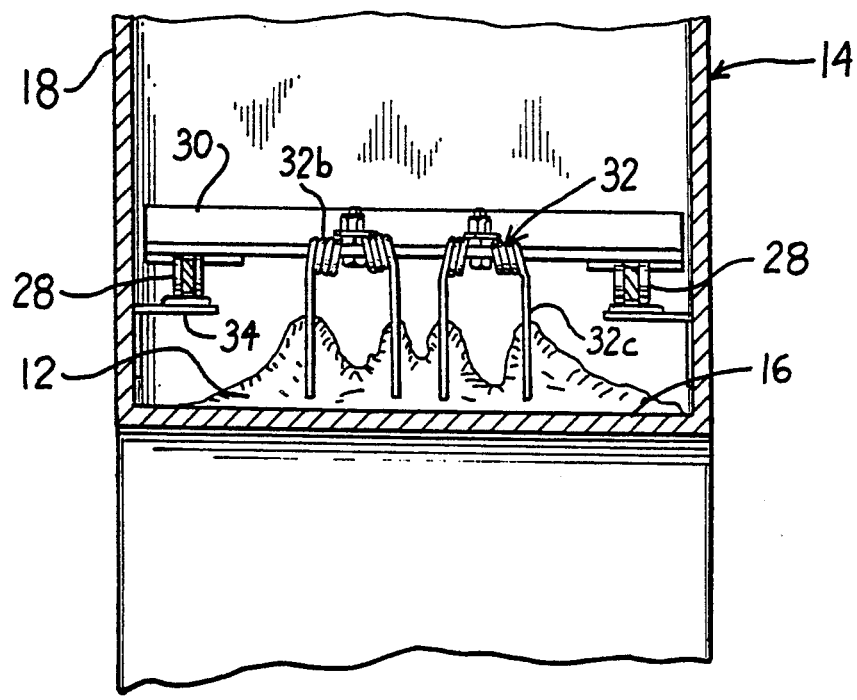
FIG. 3 is a sectional view thereof taken along line 3—3 of FIG. 1.

A flighted drag chain conveyor 26 is positioned within the conveyor enclosure. The conveyor includes a pair of drag chains 28, a plurality of flights 30 bolted to the drag chains and extending laterally across the enclosure 14, and a plurality of drag elements 32 bolted to the flights 30 and extending downwardly therefrom. The drag chains are supported by a pair of opposing L-shaped brackets 34 which are in turn secured to the side walls 18 of the conveyor enclosure 14. Referring to FIGS. 1 and 2, means (not shown) are provided for driving the drag chains 28 from left to right.

The drag elements 32 are spring-mounted, fork tine drag elements of the type which are sometimes employed for agricultural purposes. Each such element includes a U-shaped support 32a, a pair of coil springs 32b integrally formed with the support 32a, and a pair of tines 32c formed integrally with the respective coil springs 32b and extending downwardly towards the base 16 of the conveyor enclosure 14. The tension of the springs is sufficient to cause the tines to remain generally vertical as they move shredded waste material along the conveyor enclosure 14, but allows them to deflect, as shown in dashed lines in FIG. 2, upon contacting articles which may be relatively difficult to move. The tines will be oriented substantially perpendicularly with respect to the base of the conveyor enclosure in the absence of a force applied thereto.

As shown in FIG. 1, the drag elements 32 are preferably arranged in a staggered array from flight to flight. While arrangements of threes and twos are shown in the figure, the actual number of drag elements per flight will depend upon the width of the conveyor enclosure 14.

The tines 32c of each drag element extend nearly to the upper surface of the base 16 of the conveyor enclosure. In one embodiment of the invention, the flights 30 are located about one foot above the base of the conveyor enclosure. The tines are accordingly slightly less than one foot in length. The width of the conveyor enclosure in this embodiment is about two feet, eight inches. Staggered rows of two and three sets of drag elements may be successfully employed in an enclosure having this width.

In operation, the drag chain moves from left to right in FIG. 2, causing the tines 32c of the drag elements 32 to also move in this direction. The shredded solid waste material 12 is urged along by the tines until it falls into one of the discharge outlets 20. When an outlet is full, the material 12 simply bypasses it and is pushed by the tines to the next available outlet.

The individual tines are free to deflect about the axes of the respective coil springs 32b upon encountering locally difficult-to-move items within the shredded waste material. They snap back into their positions under the force of the springs once they have passed over such items. Subsequent offset (staggered) tines can often reposition items passed over by the previous set of tines and thereby cause them to be moved to one of the discharge outlets. All of the tines have ends which are shaped to avoid catching any of the shredded waste material. Rounded ends have been found to be suitable for this purpose.

It will be appreciated that the number of tines per drag element, or the number of drag elements per flight can be increased or decreased depending upon the needs of the system. The distance between flights can also be varied.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A system for transporting shredded solid waste material and the like, comprising:
    a conveyor enclosure including a base and a pair of opposing side walls extending upwardly from said base; and
    a flighted drag chain conveyor positioned at least partially within said conveyor enclosure, said conveyor including first and second drag chains, a plurality of flights secured to said drag chains and extending substantially laterally across said conveyor enclosure, a plurality of drag elements secured to each of said flights, each of said drag elements including a drag member substantially narrower in width than the width of said conveyor enclosure and extending towards said base of said conveyor enclosure, said drag elements of each flight being in offset relation with respect to said drag elements secured to each flight immediately adjacent thereto, and means for resiliently supporting said drag member so that it can deflect about an axis upon engaging a difficult-to-move item within said conveyor enclosure, said drag members of each of said respective drag elements being deflectable independently of said drag members of the others of said respective drag elements and being automatically returnable to their original positions upon disengagement from such a difficult-to-move item.

2. A system as defined in claim 1 wherein said means for resiliently supporting said drag member is a spring.

3. A system as defined in claim 2 wherein said spring is a coil spring and said drag member is a tine formed integrally with said coil spring.

4. A system as defined in claim 3 wherein said tine includes an end located adjacent to said base of said conveyor enclosure.

5. A system as defined in claim 4 wherein said end of said tine is rounded.

6. A system as defined in claim 1 wherein each of said drag elements includes a coil spring and a tine extending from said coil spring towards said base of said conveyor enclosure.

7. A system as defined in claim 1 wherein each of said drag elements includes a pair of coil springs and at least one time extending from each of said coil springs towards said base of said conveyor enclosure.

8. A system as defined in claim 7 wherein each of said tines extend substantially to the base of said conveyor enclosure.

9. A system as defined in claim 1 including at least one opening within said base of said conveyor enclosure and a discharge outlet positioned beneath said opening.

10. A system as defined in claim 9 wherein said discharge outlet includes walls defining an upper opening therein, said upper opening of said discharge outlet adjoining said opening within said base of said conveyor enclosure, said walls of said discharge outlet defining a leading edge and a trailing edge, said trailing edge being free of angular corners.

11. A system as defined in claim 11 wherein said trailing edge of said discharge outlet is rounded.

12. A system as defined in claim 1 including a pair of opposing support brackets mounted, respectively, to said opposing side walls of said conveyor enclosure, said first and second drag chains being supported, respectively, by said support brackets.

13. A system as defined in claim 1 wherein said side walls of said conveyor enclosure extend substantially perpendicularly with respect to said base.

14. A system as defined in claim 13 wherein said means for resiliently supporting said drag member is a spring.

15. A system for transporting shredded solid waste material and the like, comprising:
    an elongate, trough-like conveyor enclosure including a base for supporting material to be conveyed, said enclosure including at least one discharge outlet extending through said base;

a conveyor positioned above and substantially parallel to said base of said enclosure, said conveyor including a plurality of drag elements, said drag elements being offset with respect to each other in the longitudinal direction of said conveyor, each of said drag elements including at least one drag member comprising a spring-mounted tine having a substantially narrower width than the width of said enclosure, said drag members extending downwardly from said conveyor and substantially to said base of said enclosure, each of said drag members being substantially narrower in width than the width of said enclosure; and means for mounting each of said drag elements to said conveyor such that the drag member of each of said respective drag elements is individually and non-permanently deflectable with respect to the drag members of the others of said respective drag elements upon engaging a difficult-to-move item within said enclosure, but otherwise is capable of pushing material through said enclosure.

16. A system for transporting shredded solid waste material and the like, comprising:

an elongate, trough-like conveyor enclosure including a base for supporting material to be conveyed, said enclosure including at least one discharge outlet extending through said base;

a conveyor positioned above and substantially parallel to said base of said enclosure, said conveyor including a plurality of sets of drag elements, said drag elements within each set defining a row of drag elements extending laterally across a selected portion of said conveyor, each of said drag elements including at least one drag member comprising a spring-mounted tine having a substantially narrower width than the width of said enclosure, said drag members extending downwardly from said conveyor substantially to said base of said enclosure, each of said drag members being substantially narrower in width than the width of said enclosure; and means for mounting each of said drag elements to said conveyor such that the drag member of each of said respective drag elements is individually and non-permanently deflectable with respect to the drag members of the others of said respective drag elements upon engaging a difficult-to-move item within said enclosure, but otherwise is capable of pushing material through said enclosure.

* * * * *